May 5, 1931.  R. N. BROWN  1,803,317
INTERNAL COMBUSTION ENGINE
Filed March 21, 1925
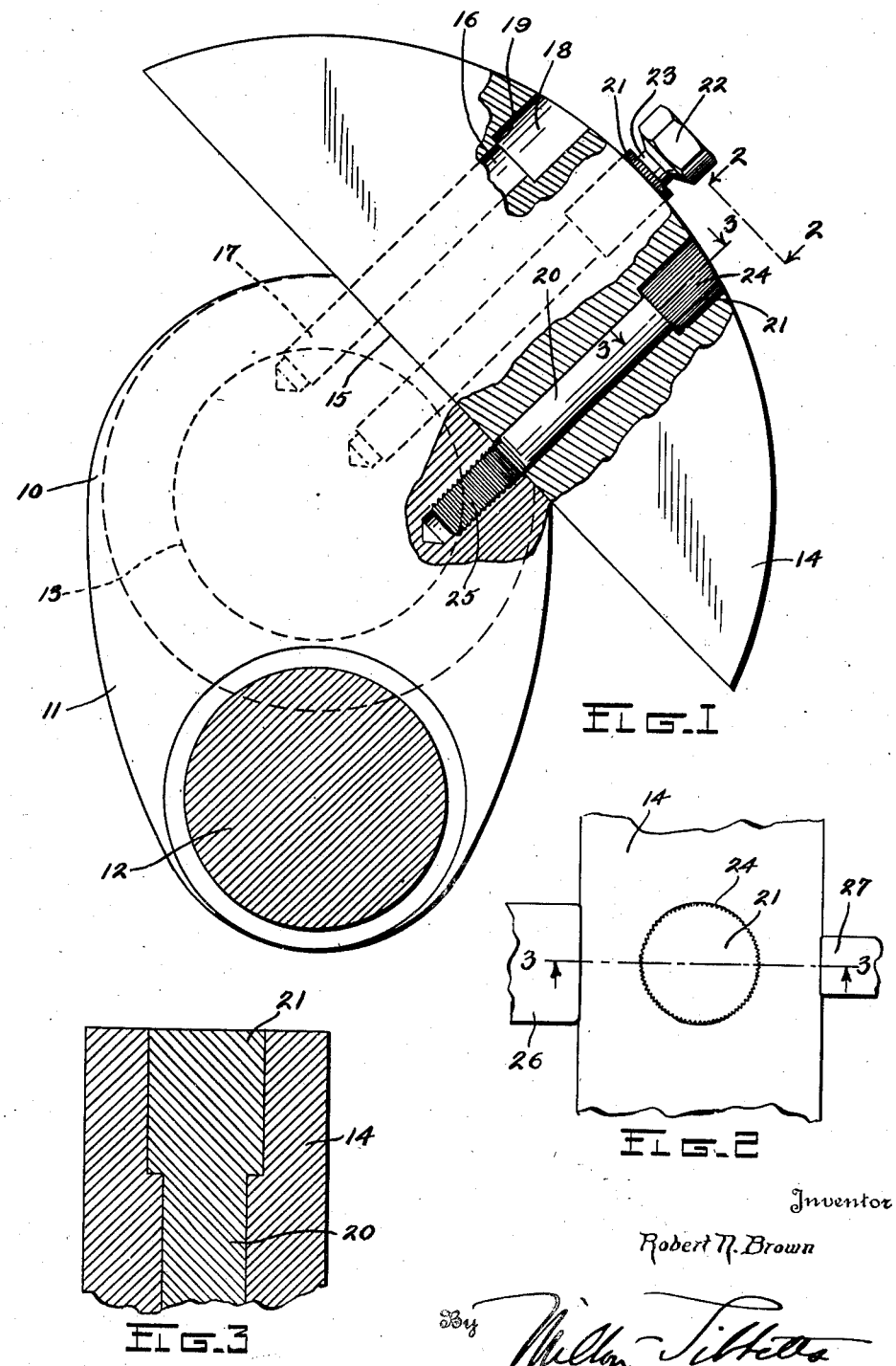
Inventor
Robert N. Brown
By
Attorney Patented May 5, 1931

1,803,317

UNITED STATES PATENT OFFICE

ROBERT N. BROWN, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed March 21, 1925. Serial No. 17,266.

This invention relates to fastening methods and means and particularly to fastening counterweights to crank shaft cheeks of internal combustion engines.

Engine crankshafts are frequently provided with counterweights of various forms. In some cases these counterweights are formed as integral ports of the countershaft, but more often they are separate pieces bolted or otherwise secured to the crankshaft. It is a matter of prime importance that the securing means for these counterweights shall hold the counterweights rigid to the shaft and shall not become loosened or shall not have any of their parts become disengaged, because in the first instance, that is if the counterweight becomes loosened the engine would very soon rack itself to pieces, and in the second instance, that is if one of the parts became disengaged, the loose part might get into some of the machinery in the engine crankcase and wreck the engine.

It is therefore one of the objects of the present invention to provide a secure fastening means for the counterweight of a crankshaft and one that will be retained in its securely fastened state.

Another object of the invention is to provide a novel method of attaching metal parts, such as crank cheek and counterweight, together so that vibration will neither loosen nor disengage them.

Another object of the invention is to provide a counterweight fastening means that may be easily and expeditiously used in the manufacture of a crankshaft.

Other objects will appear from the following description taken in connection with the drawing which forms a part of this specification, and in which:

Fig. 1 is a transverse section through a crankshaft at one of the crank pins, with parts broken away to more clearly illustrate the construction of the counterweight fastening means;

Fig. 2 is an enlarged view along the line 2—2 of Fig. 1, together with a diagrammatic illustration of means for compressing the counterweight; and Fig. 3 is also an enlarged view and is taken on the line 3—3 of both Figs. 1 and 2.

Referring to the drawing, 10 represents a crankshaft such as is used in internal combustion engines. One of the cheeks of the crankshaft is indicated at 11 and 12 is a crank pin. The broken line 13 indicates one of the main bearings of the crankshaft.

A counterweight for the crankshaft is shown at 14, and for attaching this counterweight to the cheek 11 the latter is cut away on a straight line as shown at 15. The counterweight 14 may be of any desired shape, but the shape shown in the drawing is the usual one. Also, any desired number of fastening bolts may be used, and in the form shown there are three of these bolts. For receiving the fastening bolts the counterweight 14 is bored or drilled as shown at 16 and three holes 17 are tapped into the face 15 of the cheek 11; these bored passages and drilled holes being suitably aligned as shown in the drawing. The outer end of each of the bored passages 16 is enlarged as at 18, thus providing a shoulder 19 so that the head of the bolt may fit into this enlarged part 18 and rest against the shoulder 19.

It will be understood that there is a fastening bolt for each of these three drilled-out passages. One of them has been omitted from the drawing for the purpose of clearer illustration. Each of the bolts is formed with a shank 20, a head 21, and a hexagonal portion 22, the latter portion being connected to the head 21 by a neck 23 of smaller diameter than either the head or the hexagonal portion. The head portion 21 is formed exteriorly with a roughened surface or with serrations 24. This may be done either by machining or by rolling the head against a roughened wheel or other roughened surface. Preferably these serrations run longitudinally of the bolt as shown in the drawing. The end of the shank 20 is threaded as at 25 to fit the threaded hole 17 in the cheek.

Three bolts of the form described are inserted through the passages 16 and threaded into the holes 17 of the cheek, and by means of the hexagonal portion 22 the bolts are drawn up tight so that the counterweight will be rigidly and permanently secured to the cheek 11 against the face 15 thereof. Of course the head of each bolt is drawn down tightly against a shoulder 19, and the head is so formed as to just fit within the enlarged part 18 of the passage in the counterweight.

After the bolts have thus been tightly drawn up, the counterweight 14 is placed between two jaws of a vise, or between an anvil and a press, and sufficient pressure is applied to force some of the metal of the counterweight into the serrations 24 of the head 21. Thus in Figure 2 an anvil 26 is shown on one side of the counterweight 14 opposite the head 21 of the bolt 20, and a pressure plunger 27 is shown against the opposite face of the counterweight 14. Hydraulic or other pressure means may be used to press the plunger 27 towards the anvil 26 and squeeze some of the metal of the counterweight 14 into the serration 24 of the head 21. This is a very easy machine job and the bolt 20 is so securely held thereby that no amount of vibration of the crankshaft can ever loosen it.

In Fig. 3 this fastening of the bolt head between parts of the counterweight is well illustrated.

After the bolt heads have thus been secured by pressing the sides of the counterweight against them, the hexagonal portion 22 on each of the bolts is sawed off and the part of the head 21 that projects above the surface of the counterweight 14 is removed as by filing or otherwise, so that the head of the bolt presents a smooth surface. This completes the fastening of the counterweight to the crankshaft.

While I have herein described in some detail a specific embodiment of my invention, which I deem to be new and advantageous and may specifically claim, I do not desire to be understood that my invention is limited to the exact details of the construction, as it will be apparent that changes may be made therein without departing from the spirit or scope of my invention.

Having thus described my invention, what I claim and desire to secure by Letters Patent is:

1. The method of attaching one metal piece to another metal piece, comprising passing a bolt through one piece and threading it into the other piece until the head of the bolt rests in a depression formed by the sides of the first piece, and then pressing the sides of the first piece together with the bolt head between the pressed portion until the material of the first piece enters longitudinal serrations in the bolt head and thereby prevents turning of the bolt.

2. The method of attaching a counterweight to a crank shaft comprising passing a bolt through the counterweight and threading it into the shaft until the head of the bolt rests in a depression of the counterweight corresponding to the bolt head, and then pressing the sides of the counterweight on both sides of the bolt head until the material of the counterweight enters longitudinal serrations in the bolt head and thereby prevents turning of the bolt.

3. Fastening means comprising two pieces to be fastened together, one piece having a threaded opening and the other piece being bored to receive an attaching bolt, the bore having two diameters to form a shoulder and to receive the head of the bolt within the larger bore, and a bolt extending through the bore of said other piece and threaded into said threaded opening to secure the pieces firmly together, the head of said bolt resting against said shoulder and having longitudinal serrations within the larger bore, the material of said other piece extending into the serrations on opposite sides of said bolt head to permanently retain the bolt against turning.

4. In an internal combustion engine, the combination of a crank shaft having a cheek, a counterweight adapted for attachment to said cheek, a bolt extending through the counterweight and threaded into the cheek, a part of said bolt having a roughened exterior surface, and the part of said cheek adjacent said roughened surface entering into the interstices of said roughened surface to prevent turning of the bolt.

5. A crank shaft comprising a cheek, a counterweight on said cheek, said counterweight being bored and said cheek being threaded to receive an attaching bolt, a bolt extending through said counterweight and threaded into said cheek and having its head formed with longitudinal serrations, and some of the metal of said counterweight extending into said serrations to prevent turning of the bolt.

6. A crank shaft comprising a cheek, a counterweight thereon, said counterweight being bored for an attaching bolt and having a shoulder, a bolt extending through the bore of said counterweight and threaded into said cheek to secure the counterweight to the cheek, said bolt having an enlarged head resting on said shoulder and said head having exterior serrations, and the sides of said counterweight opposite the serrated part of said bolt head being compressed and some of the metal of the counterweight extending into the serrations and thereby preventing the bolt from turning.

In testimony whereof I affix my signature.

ROBERT N. BROWN.